United States Patent Office 2,888,444
Patented May 26, 1959

2,888,444

PROCESS FOR PELLETIZING DRY RUBBER ACCELERATORS

Harold P. Roberts, Tallmadge, and Donald W. Hayes, Akron, Ohio, assignors to The Goodyear Tire & Rubber Company, Akron, Ohio, a corporation of Ohio No Drawing. Application September 23, 1955
Serial No. 536,272

12 Claims. (Cl. 260—79.5)

This invention relates to powdered vulcanization accelerators in a new and more useful form. More specifically it relates to methods for agglomerating certain powdered accelerators and to the agglomerates so formed.

The use of powered organic accelerators in the compounding of natural and synthetic rubber presents certain problems to the rubber goods manufacturer. For example, the finely divided nature of the accelerator causes it to be blown into the air during production operations such as milling. This results in an increase in the cost of production, and in the possible contamination of other materials. Then, too, certain of these accelerators create serious health hazards in production operations because once blown into the air surrounding production operations, they cause irritation to the skin and nasal passages of the workmen exposed to the contaminated air. In addition, the fine powder-like nature of the pigment makes uniform dispersion difficult since the pigment tends to form lumps and flakes which stick to or cake on the mill rolls, thus increasing the time and effort required to form an intimate and thorough dispersion of the pigment in the rubber.

Efforts have been made to reduce the objectionable features of the powdered accelerators by converting the finely divided pigment particles into some form of agglomerate. It has usually been found that, in order to form such agglomerates, some additive must be used with the powdered pigment if the agglomerate, once formed, is to be stable. Frequently, the additives are materials which may be objectionable when ultimately mixed into the rubber compound with which the accelerator is to be used. Other additives produce agglomerates which are relatively cohesive and not free-flowing, with the result that such agglomerates do not lend themselves to normal handling and weighing procedures. Other additives employed for preparing agglomerated accelerators are used in such large amounts that the rubber chemist is required to work with an excessively "diluted" accelerator. Other treatments produce agglomerated accelerators which do not disperse readily into the rubber during the milling operation. Still other treatments result in an agglomerate which is not sufficiently stable to maintain its agglomerated form while it is transported from the manufacturer to the user. All of these objections have been overcome by preparing the powdered accelerators in an agglomerated form according to the methods of this invention.

One object of this invention is to provide for the preparation of powdered accelerators in an agglomerated form which will substantially eliminate the tendency of such accelerators to form dust which is blown into the surrounding air during storage, shipping, weighing, and processing operations. The use of these novel forms of accelerator results in a material saving to the manufacturer, the elimination of a source of contamination, and the elimination of a health hazard to the workmen handling such materials.

Another object of this invention is to provide for the preparation of these accelerators in an agglomerated form of such a nature that the individual particles of the agglomerate will hold together during normal handling operations and yet will disperse uniformly into and through the rubber during the milling operation. Still another object is to provide for the preparation of agglomerated organic rubber vulcanization accelerators which disperse more rapidly into the rubber during milling than will the unagglomerated powdered accelerator itself. An additional object is to prepare agglomerated accelerators which are free-flowing and not cohesive. Another object is to prepare agglomerated organic accelerators with a minimum amount of diluent. Still another object is to prepare agglomerated accelerators which contain no materials deleterious to the rubber compound with which the accelerator is to be used.

The rubber accelerators employed in the practice of this invention are tetramethyl thiuram disulfide, tetraethyl thiuram disulfide, tetramethyl thiuram mono-sulfide, zinc dimethyl dithiocarbamate, zinc diethyl dithiocarbamate, zinc dibutyl dithiocarbamate, mercaptobenzothiazole, benzothiazyl disulfide, and the water-insoluble metal salts of mercaptobenzothiazole such as zinc mercaptobenzothiazole and lead mercaptobenzothiazole. For certain compounding purposes two or more of these accelerators may be employed to form mixed agglomerates.

It has been proposed to employ natural or synthetic rubber latex in the preparation of agglomerated accelerators. However, these accelerators, and particularly mercaptobenzothiazole and zinc mercaptobenzothiazole, when mixed with latex cause coagulation of the latex before the latex and the accelerator can be thoroughly blended together. This premature coagulation prevents the production of agglomerated accelerators having the desired characteristics.

In accordance with this invention, it has been found that the objects of this invention can be accomplished by mixing the accelerator with a small amount of a rubber latex containing an antioxidant and an acid-stable synthetic emulsifier, forming agglomerates from the paste-like mixture and drying the agglomerates.

The rubber latices useful in the practice of this invention are natural rubber latex, polychloroprene latex, polybutadiene latex, the latices of the rubbery copolymers of butadiene and styrene and the latices of the rubbery copolymers of butadiene and acrylonitrile. Of these, the latices of the rubbery copolymers of butadiene and styrene and the latices of the rubbery copolymers of butadiene and acrylonitrile are preferred.

The acid-stable synthetic emulsifiers useful in the practice of this invention may be anionic, cationic or non-ionic in nature. The anionic acid-stable synthetic emulsifiers include (1) the metal salts of alkyl aryl sulfonates examples of which are the sodium alkyl aryl sulfonates such as sodium dodecyl naphthalene sulfonate and similar materials sold under the trade name Nacconol NR by National Aniline, (2) the metal salts of alkyl sulfonates, examples of which are sodium myristyl sulfonates and sodium n-decyl sulfonate, (3) the metal salts of alkyl sulfates such as sodium lauryl sulfate and sodium myristyl sulfate, (4) the metal salts of sulfated and sulfonated amides and amines such as sodium alkyl phenol ethylene oxide sulfate, and (5) the metal salts of sulfated and sulfonated esters and ethers such as the ester of oleic acid and hydroxyethane sodium sulfate.

Materials that are cationic in nature when ionized may also be useful in the practice of this invention. Some of these cationic acid-stable materials are: dipolyoxyethylene alkyl tertiary amines resulting from the condensation of ethylene oxide with organic amines, where the alkyl group is derived from fatty acids containing from 12 to 18 carbon atoms and from 2 to 50 mols of ethylene oxide are used. Examples of such materials are available commercially under the trade name "Ethomeens" from Armour and Company, Chicago, Illinois. Another useful type of cationic material is rosin acid substituted amine salts such as dehydroabietylamine acetate commercially available under the trade name "Rosin Amine D" from Hercules Powder Company, Wilmington, Delaware.

Nonionic wetting agents or emulsifiers that are acid-stable are also useful in the practice of this invention. One of these nonionic materials is an alkylated aryl polyether alcohol such as the material sold under the trade name "Triton X–100" by Rohm and Haas, Philadelphia, Pennsylvania.

In the practice of this invention it is preferred to use an alkyl aryl sulfonate such as sodium alkyl aryl sulfonate. With some powdered accelerators it is helpful to use, in conjunction with the acid stable anionic sodium alkyl aryl sulfonate, a small amount of an acid-stable nonionic material such as an alkylated aryl polyether alcohol or a cationic material such as a dipolyoxyethylene alkyl tertiary amine.

In addition to the acid-stable emulsifier, the latex should contain an antioxidant such as phenyl beta naphthylamine and preferably a non-discoloring antioxidant such as the styrenated and alkylated phenols and phenyl phosphites in order to preserve the rubber content of the agglomerate against aging during storage.

In the preparation of the agglomerate, it is preferred that a minimum amount of latex be employed for the reason that the users of the accelerator usually desire one which contains the least possible amount of non-accelerator diluent. It has been found that the latex required to produce satisfactory agglomerates of the specific accelerators mentioned above should provide at least 4 parts by weight of rubber hydrocarbon per 100 parts by weight of the powdered accelerator. While satisfactory agglomerates can be produced using as much as 10 parts by weight of rubber hydrocarbon per 100 parts by weight of accelerator, it is preferred that from 4 to 6 parts by weight be used to minimize the dilution of the accelerator by the rubber hydrocarbon.

In mixing of the latex with the powdered accelerator, sufficient water must be provided to wet all the particles of powder. If sufficient water is not present there is a dehydration of the latex by the dry powder which results in coagulation of the latex before there is complete mixing of latex and accelerator. Usually the latex itself furnishes enough water to wet the powder but, if necessary, additional water may be added. This wetting of the powdered accelerator is greatly enhanced by the inclusion, in the latex, of a synthetic wetting or surface active agent such as a dipolyoxyethylene alkyl tertiary amine or an alkylated aryl polyether alcohol. After the latex has been mixed with the accelerator the mixture has a paste-like consistency which lends itself readily to the formation of agglomerates by means of any conventional type of pellet-forming apparatus such as a granulator, molding press, corrugated rolls or an extruder. The amount of water contained in the paste-like mixture will depend upon the particular accelerator being agglomerated and is believed to be at least in part controlled by the particle size and shape of the particular accelerator. In general, it has been found that the larger the particle size, the smaller the amount of water required to provide the paste-like consistency necessary for the formation of the agglomerates. It has been observed that from 10% to 50% water by weight of the total mix is required to provide the desired paste-like consistency.

The preferred method for forming the agglomerates is to extrude the paste-like mixture through a die provided with a plurality of small cylindrical holes. The mixture leaves the extruder in the form of strings or rods which are collected, preferably on a moving belt, and then dried. Excessively high drying temperatures are to be avoided in order to prevent discoloration of the agglomerates or melting of the accelerator. Temperatures in the range of 100° to 125° F. have been found to be satisfactory. During the drying operation the water present in the product is removed, leaving an agglomerate of the powdered accelerator containing the solids content of the latex as the only added diluent of the accelerator. If desired for purposes of identification, it is possible to produce colored agglomerated accelerators by the addition of small amounts of coloring agents to the mix.

Further details of the practice of this invention are set forth in the following examples in which parts are by weight unless otherwise stated. These examples are to be interpreted as representative rather than restrictive of the scope of this invention:

*Example 1*

Latex (650 parts) containing 227 parts of rubber hydrocarbon was placed in a suitable mixer, such as a Baker-Perkins or a Simpson mix muller. This latex had been made by the reaction of 75 parts of butadiene and 25 parts of styrene using 5 parts of a sodium alkyl aryl sulfonate as the emulsifier. A styrenated phenol (2.84 parts) was added as a non-staining antioxidant. Water (500 parts) was added to the latex. To aid in stabilizing the latex and wetting the dry powdered accelerator, 0.05 part of a dipolyoxyethylene alkyl tertiary amine was added. To the stabilized latex was added 4300 parts of powdered tetramethyl thiuram disulfide. The total mixture was agitated until the rubber latex and powdered accelerator were completely blended. The mixture at this point had a paste-like consistency and this paste was extruded into rods or strings which were dried at 125° F.

*Example 2*

Latex (14.3 parts) containing 5 parts of rubber hydrocarbon was placed in a suitable mixer. This latex had been made by the reaction of 75 parts of butadiene and 25 parts of styrene using 5 parts of a sodium alkyl aryl sulfonate as the emulsifier. A styrenated phenol (0.0625 part) was added as an antioxidant. Water (30 parts) was added to this latex along with 0.5 part of a dipolyoxyethylene alkyl tertiary amine to aid in stabilizing the latex and in wetting the powdered accelerator. To the stabilized latex was added 67 parts of powdered tetramethyl thiuram disulfide and 33 parts of powdered mercaptobenzothiazole. The latex, water, and accelerator were mixed until completely blended at which time the mixture had a paste-like consistency. This paste was extruded into rods or strings which were dried at 125° F.

*Example 3*

The same procedure was followed as in Example 2 except 95 parts of the zinc salt of mercaptobenzothiazole was added instead of 67 parts of tetramethyl thiuram disulfide and 33 parts of mercaptobenzothiazole.

*Example 4*

The same procedure was followed as in Example 1 except tetramethyl thiuram monosulfide was added instead of tetramethyl thiuram disulfide.

*Example 5*

The same procedure was followed as in Example 2 except 95 parts of zinc dimethyl dithiocarbamate were added instead of 67 parts of tetramethyl thiuram disulfide and 33 parts mercaptobenzothiazole.

The sodium alkyl aryl sulfonate employed in the examples is sold by National Aniline under the trade name Nacconol NR.

The agglomerated accelerators prepared according to Examples 1 through 5 formed stable, non-dusting, rod-like agglomerates which were free-flowing. It will be noted that various amounts of water were used to prepare these agglomerates. The variance in added water was to obtain a paste that could be properly extruded. When these agglomerates were mixed with rubber on a mill or in a banbury, in accordance with normal practice, the agglomerates dispersed more rapidly and more uniformly into the rubber than did the dry powdered accelerators from which the agglomerates were made. Thus, it will be seen that by following the practices of this invention, it is possible to produce a free-flowing stable non-dusting agglomerated accelerator containing only a minimum amount of diluent. The agglomerates maintain their stability during storage and handling operations and yet disperse rapidly and uniformly into and through the rubber compound with which they are used.

While certain representative embodiments and details have been shown for the purpose of illustrating the invention, it will be apparent to those skilled in this art that various changes and modifications may be made therein without departing from the spirit or scope of the invention.

We claim:

1. A method for preparing an agglomerated compounding ingredient for rubber which comprises mixing at least one powdered vulcanization accelerator selected from the group consisting of tetramethyl thiuram disulfide, tetraethyl thiuram disulfide, tetramethyl thiuram monosulfide, zinc dimethyl dithiocarbamate, zinc diethyl dithiocarbamate, zinc dibutyl dithiocarbamate, mercaptobenzothiazole, water insoluble metal salts of mercaptobenzothiazole and benzothiazyl disulfide, with a latex stabilized against coagulation by at least one acid-stable emulsifier and a rubber antioxidant, said latex being selected from a group consisting of natural rubber latex, polychloroprene latex, polybutadiene latex, the latices of the rubbery copolymers of butadiene and styrene and the latices of the rubbery copolymers of butadiene and acrylonitrile, the mixture containing by weight from 4 to 10 parts of rubber hydrocarbon per 100 parts of said accelerator, forming agglomerates of the mixture, drying the agglomerates to remove water and collecting the dried agglomerates.

2. A method for preparing an agglomerated compounding ingredient for rubber which comprises forming an aqueous mixture of at least one powdered vulcanization accelerator selected from the group consisting of tetramethyl thiuram disulfide, tetraethyl thiuram disulfide, tetramethyl thiuram monosulfide, zinc dimethyl dithiocarbamate, zinc diethyl dithiocarbamate, zinc dibutyl dithiocarbamate, mercaptobenzothiazole, water insoluble metal salts of mercaptobenzothiazole, and benzothiazyl disulfide, with a latex stabilized against coagulation by at least one acid-stable synthetic emulsifier and a non-discoloring rubber antioxidant, said latex being selected from a group consisting of natural rubber latex, polychloroprene latex, polybutadiene latex, the latices of the rubbery copolymers of butadiene and styrene and the latices of the rubbery copolymers of butadinene and acrylonitrile, the mixture containing from 4 to 10% rubber hydrocarbon by weight of said accelerator, forming agglomerates of the mixture, drying the agglomerates to remove water and collecting the dried agglomerates.

3. A method for preparing an agglomerated compounding ingredient for rubber which comprises mixing at least one powdered vulcanization accelerator selected from the group consisting of tetramethyl thiuram disulfide, tetraethyl thiuram disulfide, tetramethyl thiuram monosulfide, zinc dimethyl dithiocarbamate, zinc diethyl dithiocarbamate, zinc dibutyl dithiocarbamate, mercaptobenzothiazole, water insoluble metal salts of mercaptobenzothiazole, and benzothiazyl disulfide, with a latex containing at least one acid-stable synthetic emulsifier and a non-discoloring rubber anti-oxidant, said latex being selected from a group consisting of natural rubber latex, polychloroprene latex, polybutadiene latex, the latices of the rubbery copolymers of butadiene and styrene and the latices of the rubbery copolymers of butadiene and acrylonitrile, the mixture containing from 4 to 10% rubber hydrocarbon by weight of said accelerator, extruding the mixture to form strings or rods, drying the strings or rods to remove water and collecting the dried material.

4. A method for preparing an agglomerated compounding ingredient for rubber which comprises forming an aqueous mixture of at least one powdered vulcanization accelerator selected from the group consisting of tetramethyl thiuram disulfide, tetraethyl thiuram disulfide, tetramethyl thiuram monosulfide, zinc dimethyl dithiocarbamate, zinc diethyl dithiocarbamate, zinc dibutyl dithiocarbamate, mercaptobenzothiazole, water insoluble metal salts of mercaptobenbothiazole, and benzothiazyl disulfide, with a latex stabilized with at least one water-soluble, acid-stable synthetic emulsifier and a non-discoloring rubber antioxidant, said latex being selected from a group consisting of natural rubber latex, polychloroprene latex, polybutadiene latex, the latices of the rubbery copolymers of butadiene and styrene and the latices of the rubbery copolymers of butadiene and acrylonitrile, the mixture containing from 4 to 6% rubber hydrocarbon by weight of said accelerator, extruding the mixture to form strings or rods, drying the strings or rods to remove water and collecting the dried material.

5. The method for preparing an agglomerated compounding ingredient for rubber which comprises adding (A) a latex containing at least one water-soluble, acid-stable synthetic emulsifier and a rubber antioxidant, said latex being selected from a group consisting of natural rubber latex, polychloroprene latex, polybutadiene latex, the latices of the rubbery copolymers of butadiene and styrene and the latices of the rubbery copolymers of butadiene and acrylonitrile to (B) at least one powdered vulcanization accelerator selected from a group consisting of tetramethyl thiuram disulfide, tetraethyl thiuram disulfide, tetramethyl thiuram monosulfide, zinc dimethyl dithiocarbamate, zinc diethyl dithiocarbamate, zinc dibutyl dithiocarbamate, mercaptobenzothiazole, water insoluble metal salts of mercaptobenzothiazole, and benzothiazyl disulfide, the mixture containing from 4 to 10% rubber hydrocarbon by weight of said accelerator, forming agglomerates of the mixture, drying the agglomerates to remove water and collecting the dried agglomerates.

6. A method according to claim 2 in which the powdered vulcanization accelerator is mercaptobenzothiazole.

7. A method according to claim 2 in which the powdered vulcanization accelerator is the zinc salt of mercaptobenzothiazole.

8. The method according to claim 2 in which the powdered vulcanization accelerator is benzothiazyl disulfide.

9. The method according to claim 4 in which the latex stabilizer is a sodium salt of an alkyl aryl sulfonate.

10. The method for preparing an agglomerated compounding ingredient for rubber which comprises mixing mercaptobenzothiazole with a latex, formed by the polymerization of butadiene and styrene in the presence of a sodium salt of an alkyl aryl sulfonate, and containing a styrenated phenol as an antioxidant, the mixture containing from 4 to 6% rubber hydrocarbon by weight of said mercaptobenzothiazole, extruding the mixture into rods or strings, drying the rods or strings and collecting the dried rods or strings.

11. The method for preparing an agglomerated compounding ingredient for rubber which comprises mixing the zinc salt of mercaptobenzothiazole with a latex, formed by the polymerization of butadiene and styrene in the presence of a sodium salt of an alkyl aryl sulfonate, and containing a styrenated phenol as an antioxidant, the mixture containing from 4 to 6% rubber hydrocarbon by weight of said mercaptobenzothiazole, extruding the mixture into rods or strings, drying the rods or strings and collecting the dried rods or strings.

12. A method according to claim 2 in which the powdered vulcanization accelerator is tetramethyl thiuram disulfide.

References Cited in the file of this patent
UNITED STATES PATENTS

| | | |
|---|---|---|
| 2,565,998 | Swaney et al. | Aug. 28, 1951 |
| 2,640,088 | Glenn et al. | May 26, 1953 |